United States Patent
Hansen et al.

(10) Patent No.: US 9,669,859 B2
(45) Date of Patent: Jun. 6, 2017

(54) STROLLER FOR A CHILD WHICH IS CONVERTIBLE INTO BICYCLE TRAILER

(71) Applicant: DOREL FRANCE, Cholet (FR)

(72) Inventors: Claire Hansen, Brissac-Quince (FR); Vincent Chiffoleau, Mortagne-sur-Sevre (FR); Baptiste Durand, Cholet (FR); Bruno Zweideck, Cholet (FR)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 14/780,178

(22) PCT Filed: Mar. 28, 2014

(86) PCT No.: PCT/EP2014/056378
§ 371 (c)(1),
(2) Date: Sep. 25, 2015

(87) PCT Pub. No.: WO2014/154903
PCT Pub. Date: Oct. 2, 2014

(65) Prior Publication Data
US 2016/0144880 A1    May 26, 2016

(30) Foreign Application Priority Data
Mar. 28, 2013   (FR) ...................... 13 52840

(51) Int. Cl.
*B62B 7/12* (2006.01)
*B62B 1/00* (2006.01)
(Continued)

(52) U.S. Cl.
CPC ............. *B62B 7/126* (2013.01); *B62B 1/002* (2013.01); *B62B 7/044* (2013.01); *B62B 9/20* (2013.01);
(Continued)

(58) Field of Classification Search
CPC ......... B62B 7/126; B62B 1/002; B62B 7/044; B62B 7/046; B62B 9/20; B62K 27/003
See application file for complete search history.

(56) References Cited

U.S. PATENT DOCUMENTS 5,308,096 A    5/1994 Smith
5,454,577 A *  10/1995 Bell .................. B62B 3/02
                                                280/204
(Continued)

FOREIGN PATENT DOCUMENTS

DE          29919159 U1    4/2000
DE     102005029448 B4    1/2012
(Continued)

OTHER PUBLICATIONS

English Translation of the Written Opinion issued in connection with PCT/EP2014/056378.
(Continued)

*Primary Examiner* — Brian Swenson
(74) *Attorney, Agent, or Firm* — Barnes & Thornburg LLP

(57) ABSTRACT

A juvenile stroller includes a seat, wheels, and a push handle. The push handle is mounted for pivoting movement about an axis relative to the seat. The push handle pivots between a stroller position and a trailer position. Movement of the push handle to the trailer position corresponds to a front wheel or wheels movement to a stowed position.

27 Claims, 8 Drawing Sheets

(51) Int. Cl.
*B62K 27/00* (2006.01)
*B62B 7/04* (2006.01)
*B62B 9/20* (2006.01)

(52) U.S. Cl.
CPC ........ *B62K 27/003* (2013.01); *B62B 2205/12* (2013.01)

(56) References Cited

U.S. PATENT DOCUMENTS

| | | | |
|---|---|---|---|
| 6,196,572 B1 * | 3/2001 | Durrin | B62B 7/06 280/204 |
| 6,991,249 B2 * | 1/2006 | Shapiro | B62B 1/206 280/47.34 |
| 7,387,310 B1 * | 6/2008 | Liu | B62B 7/10 280/47.38 |
| D633,825 S * | 3/2011 | van Leeuwen | D12/101 |
| 7,992,889 B2 * | 8/2011 | Ehrenreich | B62B 7/12 280/202 |
| 9,315,206 B2 * | 4/2016 | Fleming | B62B 5/064 |
| 2002/0096857 A1 * | 7/2002 | Valdez | B62B 7/12 280/293 |
| 2006/0108766 A1 | 5/2006 | Staszak | |

FOREIGN PATENT DOCUMENTS

| | | |
|---|---|---|
| EP | 1162134 A1 | 12/2001 |
| FR | 967288 A | 10/1950 |
| GB | 712106 A | 7/1954 |
| NL | 72528 C | 6/1953 |
| WO | 2007108676 A2 | 9/2007 |

OTHER PUBLICATIONS

PCT International Search Report and Written Opinion completed on Jun. 25, 2014 and issued in connection with PCT/EP2014/056378.

* cited by examiner

STROLLER FOR A CHILD WHICH IS CONVERTIBLE INTO BICYCLE TRAILER

CROSS REFERENCE TO RELATED APPLICATIONS

This application is a U.S. nationalization under 35 U.S.C. §371 of International Application No. PCT/EP2014/056378, filed Mar. 28, 2014, which claims priority to French Application No. 1352840, filed Mar. 28, 2013.

FIELD OF THE INVENTION

The field of the invention is that of child care. More precisely, the invention relates to carriages for children, or strollers. Certain strollers, referred to in what follows as convertible, are designed to be able to be used in several configurations, and more particularly to be attached to a bicycle.

This invention relates particularly to such strollers which can be transformed into a trailer for a bicycle.

Solutions of Prior Art

Several models of strollers have already been designed in different configurations, namely a "stroller" position and a "trailer" position.

Strollers are as such known that can be connected to a bicycle. Such strollers are for example described in document DE 299 19 159 and include, in this case, a handlebar that can be tilted forwards in order to take a horizontal position when it is intended to be connected to a bicycle. According to this document, the passage in "trailer" position is complex, and requires in particular the removal of the front wheels and the handle, in order to replace it with a tow bar. Furthermore, the transport case that plays the role of a seat for the child must also be removed then remounted.

Document DE 10 2005 029 448 discloses an alternative of this type of stroller wherein the tilting of the handlebar controls, via a set of connecting rods, the height of the seat in such a way that the latter is lowered, in the "trailer" position. This is a complex, cumbersome and expensive mechanism. According to this document, the handlebar can be transformed into a tow bar in the "trailer" position subject to having first opened the latter in order to pivot a portion of it according to the axis of the hitch and attach this portion to the hub of the rear wheel of the bicycle.

Furthermore, according to the technique of this document, the front wheels of the stroller remain in contact with the ground in "trailer" position. In this position, the ensemble is therefore difficult to handle, in particular in curves, and is cumbersome.

As such, strollers that can be converted into a trailer of prior art have several disadvantages, which have the consequence of having problems concerning practicality, ergonomics, safety and manufacturing complexity.

One of the disadvantages of these strollers that can be converted into a trailer is therefore the complexity of their mechanism for changing configuration. Indeed, this mechanism requires operations for adapting the chassis (removal and/or opening of the handlebar) in order to be connected to the bicycle. It is therefore not very easy to use them, and manufacturing them is complex. It is consequently expensive to manufacture these strollers.

Furthermore, due to the multiplicity of the movements and operations required, users do not use, or use very little, the possibility of changing positions. These operations must moreover be carried out empty, without a child being installed in the seat. The change in position therefore supposes taking the child out of the seat, leaving him to wait next to the stroller, performing the manipulations (which does not make it possible to carry or hold the child), then to install the child again in the seat.

In addition, this complexity leads to heavy products, and which therefore are not adapted in particular for towing using a bicycle. These strollers are consequently, generally, not very ergonomic and are difficult to use, in the "stroller" position as well as in the "trailer" position.

Yet another disadvantage of some of these strollers that can be converted into a trailer of prior is the need to remove, then store, the front wheel or wheels of the stroller during the change of position.

OBJECTIVES OF THE INVENTION

The invention has in particular for objective to overcome these disadvantages of prior art.

More precisely, an objective of the invention is to provide a stroller that can switch simply and easily from a stroller position to a trailer position.

Another objective of the invention is, according to at least one embodiment, to provide such a stroller of which the use in its trailer position is particularly easy and comfortable for the user.

Another objective of the invention is, according to at least one embodiment, to provide a stroller that can be transformed into a trailer without requiring removing the child during this change of position and without resulting in discomfort or a risk for the child.

Yet another objective of the invention is, according to at least one embodiment, to provide such a stroller that offers a good level of comfort for the child transported, whether in the stroller position or in the trailer position.

An objective of the invention is, according to at least one embodiment, to provide such a stroller that is easy to manufacture, and of reduced cost.

EXPOSURE OF THE INVENTION

These objectives, as well as others that shall appear in what follows, are achieved using a stroller for a child, which is convertible into a bicycle trailer, comprising a chassis carrying at least one seat and a handlebar.

According to the invention said handlebar is hingedly mounted in relation to said chassis and able to tilt between:
- a "stroller" position, wherein an end portion, referred to as the gripping area, of said handlebar makes it possible to guide and move said stroller, and
- a "trailer" position, wherein said gripping area of the handlebar can be secured to a bicycle.

In addition, the stroller comprises means for stowing a front wheel or wheels, controlled by the tilting of said handlebar, with the front wheel or wheels being in an operational position, in contact with the ground, in "stroller" position, and in a stowed position, not interacting with the ground in "trailer" position.

As such, according to the invention, the end portion of the handlebar, here called the gripping area, is used in the two positions. In the "stroller" position, it conventionally forms the handle or handles, i.e. the area where the user places his hands in order to push and guide the stroller. In the "trailer" position, this same gripping area constitutes the securing element to the bicycle.

Moreover, the tilting of the handlebar drives the stowing or the automatic setting into place of the said front wheel or wheels. Consequently, the change from the "stroller" to "trailer" position, or inversely, requires only a simple tilting of the handlebar, of which the end plays both the role of guiding the stroller in "stroller" position then as an attaching in "trailer" position.

"Trailer" position means a position of the stroller able to be connected to the bicycle. Once this "trailer" position is established, the user only has to fasten the bicycle and this without modifying the position of the seat, and while retaining the direction of displacement of the whole (regardless of the position, the child faces forward).

In other terms, the conversion implemented according to the invention makes it possible to retain the orientation of the child with respect to the displacement. Indeed, according to this invention, the child will always be placed in the forward direction. As such, the conversion of the stroller into a trailer (or inversely) does not introduce any change in the orientation of the child which provides him with comfort.

The invention makes it possible to avoid, since everything is carried out by a simple tilting of the handlebar, any operation of removal or of adapting the chassis in order to switch to "trailer" position. In particular, it is not necessary to remove the front wheels and/or the handlebar in order to switch to "trailer" position.

It is as such possible to perform this change in position even in the presence of the child. As such the child remains attached to the stroller, for example by means of a harness, such as a five-point anchoring harness, during the change in position which guarantees his safety.

Moreover, due to the fact that the change in position can, according to the invention, be carried out in the presence of the child, time is saved in performing such a conversion. It is as such possible, for example, to use the stroller in the "trailer" position to transport the child to the park, by bicycle, to park the bicycle and to continue the walk in the park (or indoors, for example in a shop), in "stroller" position.

As such, the stroller that can be transformed into a trailer for a bicycle according to the invention is extremely practical, due to the fact that the change in position is easy and rapid.

Note that the stroller according to the invention can include one or several seats that may or may not be removable, where applicable independent from one another, allowing for the transport of one or two or more children, in order to form a double stroller (two children), and even a triple stroller (three children).

In this case, the stroller can be a double stroller/trailer that makes it possible to install and transport two children side by side (in this case the chassis carries two neighbouring seats arranged in the same plane or a double seat) or one behind the other (in this case the chassis carries two seats arranged one behind the other).

The seat is chosen from among a plurality of different seats, suited to the different ages of the child or which allows for different positions: a seat, sometimes called a "hammock", which can be foldable or rigid, a rigid shell that can also be used as a car seat, a nacelle making it possible to transport a baby in a lying down position, etc.

The seat or seats can be removable and/or independent, for example in order to make it possible to incline the backrest of one seat without inclining the other seat.

According to an advantageous embodiment of the invention, in said stowed position, the front wheel or wheels are displaced under said at least one seat carried by the chassis.

The displacement of the wheels under the seat (with this term encompassing, in what follows, the case where there are several seats) limits the space taken up by the hitch and makes it possible to prevent the child or the cyclist from getting injured during the handling of the trailer.

For example, according to a simple alternative of this embodiment, it can be considered that the front wheel or wheels are folded back flat under the seat.

According to another alternative of this embodiment, a housing specifically provided for accommodating the front wheel or wheels is provided under the seat in such a way that the front wheel or wheels are completely or partially integrated through nesting under the seat.

Advantageously, the front wheel or wheels are carried by two front shafts extending in the extension of two uprights of said handlebar, with the front shafts tilting simultaneously with said uprights.

As such, the front wheel or wheels are connected to the handlebar in such a way that the pivoting of the handlebar necessarily results in the stowing of the wheel or wheels.

This can in particular be a wheel or a single block of wheels.

Preferentially, on each side of the stroller, a front shaft and an upright form the same part.

As such, the cost of manufacturing the stroller is reduced due to the fact that the number of parts comprising it is limited.

Advantageously, the chassis, or said one seat carried by said chassis, carries two hinging nodes, allowing for the tilting.

The implementing of the tilting is therefore simple due to the fact that the hinging nodes provide fluidity of the tilting in such a way as to limit the shaking that could occur during the change in position.

Preferentially, at least one of the nodes carries means for blocking, able to maintain the handlebar in the "stroller" position and/or in said "trailer" position, and means of unlocking, making it possible to release said means for blocking in order to tilt said handlebar.

These means for blocking therefore make it possible to secure each position of the stroller that is convertible into a bicycle trailer according to the invention.

According to an alternative embodiment, the stroller comprises, in the vicinity of the front wheel or wheels, a first element for locking, able to cooperate respectively with:
- in the "stroller" position, a second complementary element for locking mounted in the vicinity of a footboard secured to said seat; and
- in the "trailer" position, a third additional element for locking mounted in the vicinity of the lower portion of the backrest of said seat.

This approach makes it possible to obtain a robust locking in the two positions, and makes it possible to limit the possible play felt on the handlebar.

Means for unlocking can be provided, in order to release said means for blocking or said elements for locking in order to allow for the tilting of said handlebar, comprising an unlocking control mounted on the backrest of said seat and at least one transmission cable.

Advantageously, the length of said front shafts represents between 25 and 35% of the length of said uprights.

Such a proportion between the uprights and the shafts makes it possible in particular to retain balance and stability in the two positions, and during the change in position. In particular, the front wheel or wheels can roll on the ground during a portion of the tilting, which makes the change in position easier and more comfortable, the seat remaining substantially in a normal inclination.

According to a particular embodiment, said seat carries said handlebar and/or bases of the rear wheel.

A self-carried structure is as such formed, that is particularly simple to implement.

LIST OF FIGURES

Other characteristics and advantages of the invention shall appear more clearly when reading the following description of a preferred embodiment, provided as a simple example for the purposes of information and which is not restricted, and the annexed drawings, among which:

FIGS. 1A and 1B respectively show in perspective an embodiment of the invention in stroller position and in trailer position;

FIGS. 2A and 2B respectively show as a side view an embodiment of the invention in stroller position and in trailer position;

FIGS. 3A and 3B respectively show as a front view an embodiment of the invention in stroller position and in trailer position;

FIGS. 4A and 4B respectively show as a rear view an embodiment of the invention in stroller position and in trailer position;

FIGS. 5A and 5B respectively show as a top view an embodiment of the invention in stroller position and in trailer position;

Figure 10A:
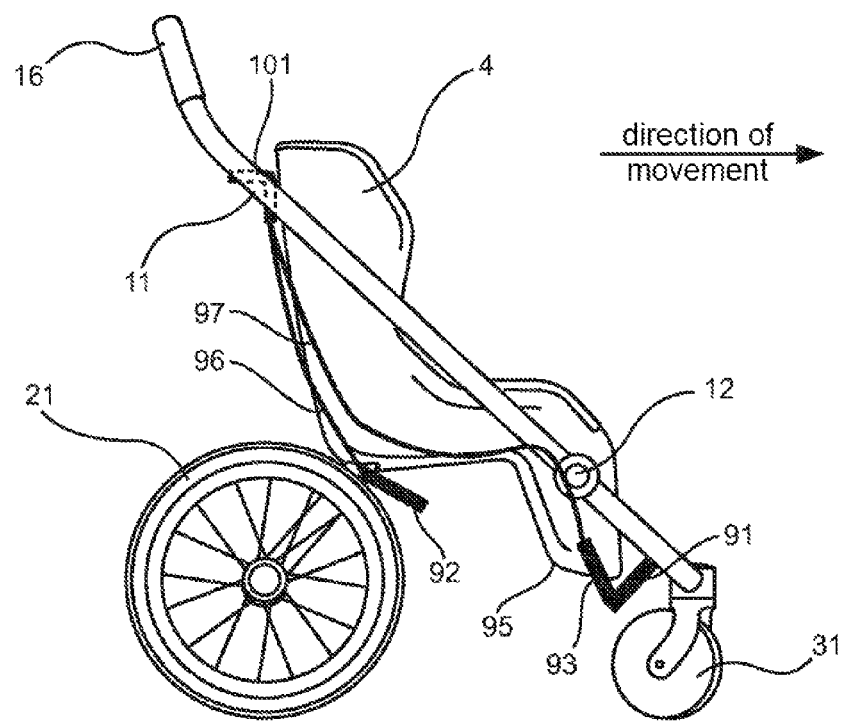
Figure 10B:
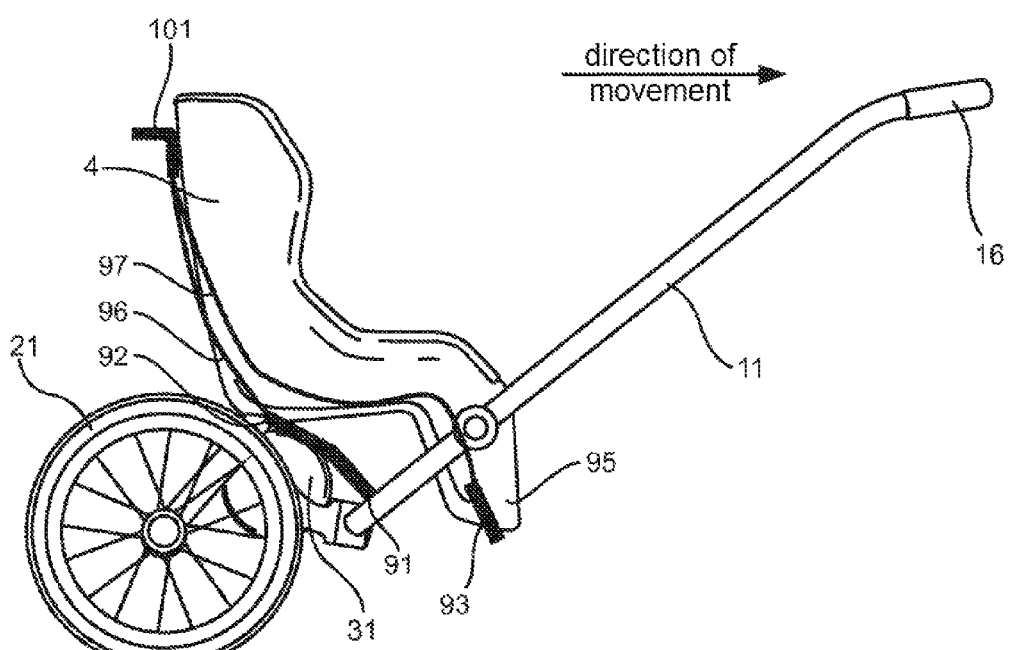

FIGS. 10A and 10B diagrammatically show an alternative of the blocking of the stroller of the invention in the two positions.

DETAILED DESCRIPTION OF THE INVENTION

1. Reminder of the Principle of the Invention

The general principle of the invention is based on the tilting of the handlebar of the stroller, which allows on the one hand the switching of the stroller from the "stroller" position to the "trailer" position or inversely, and on the other hand the stowing of the front wheels of the stroller, in the "trailer" position, or their deployment in the "stroller" position.

As such, when the stroller comprises a single seat (embodiment described in what follows), in "stroller" position the upper end of the handlebar is placed at the rear of the seat transporting the child and the front wheel or wheels are deployed (in contact with the ground), while in "trailer" position the handlebar is tilted with respect to the seat, or to the chassis, so that its upper end can be attached to the rear of a bicycle. The tilting of the handlebar automatically actuates the means for stowing the front wheel or wheels.

The passing from the "stroller" position to the "trailer" position is therefore simple and rapid and makes it possible to limit the load of the trailer felt by the cyclist while also relieving him of the operations of disassembly the stroller. The cyclist can therefore avoid having to carry tools for disassembly when he leaves for a walk, and does not have to worry about storing disassembled elements.

2. The Stroller in "Stroller" Position

Figure 1A:
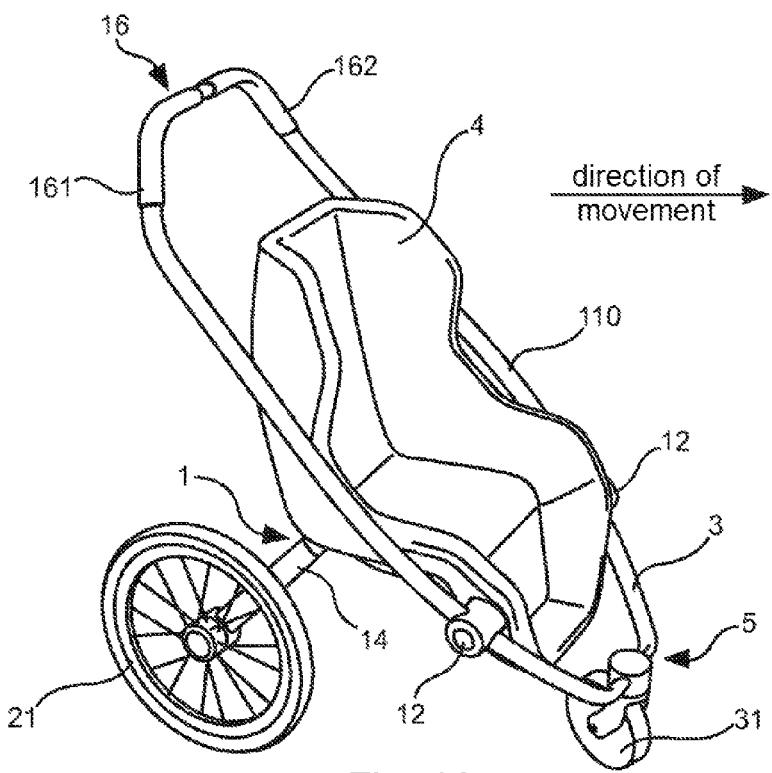

FIG. 1A shows a perspective view of the stroller in "stroller" position according to an embodiment of the invention, in a conventional configuration with three wheels (or blocks of wheels). It is clear that, in the scope of the invention, the stroller can also have four wheels.

In this embodiment shown in FIG. 1A, the stroller comprises a single seat. Note that the stroller can also comprise several removable and independent seats allowing for the transport of several children (for example two or three) side by side or one behind the other.

The base of this stroller is formed of a chassis 1, which for example implements tubular elements. In the embodiment shown, the seat 4 functionally provides a part of the functions of the chassis, in particular by directly carrying the rear bases 14 and the hinging nodes 12. A "self-carrying" chassis is as such formed, that is very simple and well adapted to the two positions of transport of the invention. Of course, it is possible, without leaving the scope of the invention, to provide a more conventional chassis, that interconnects all of the wheels and carrying at least one seat (that can then be removed and can be interchanged).

Figure 1B:
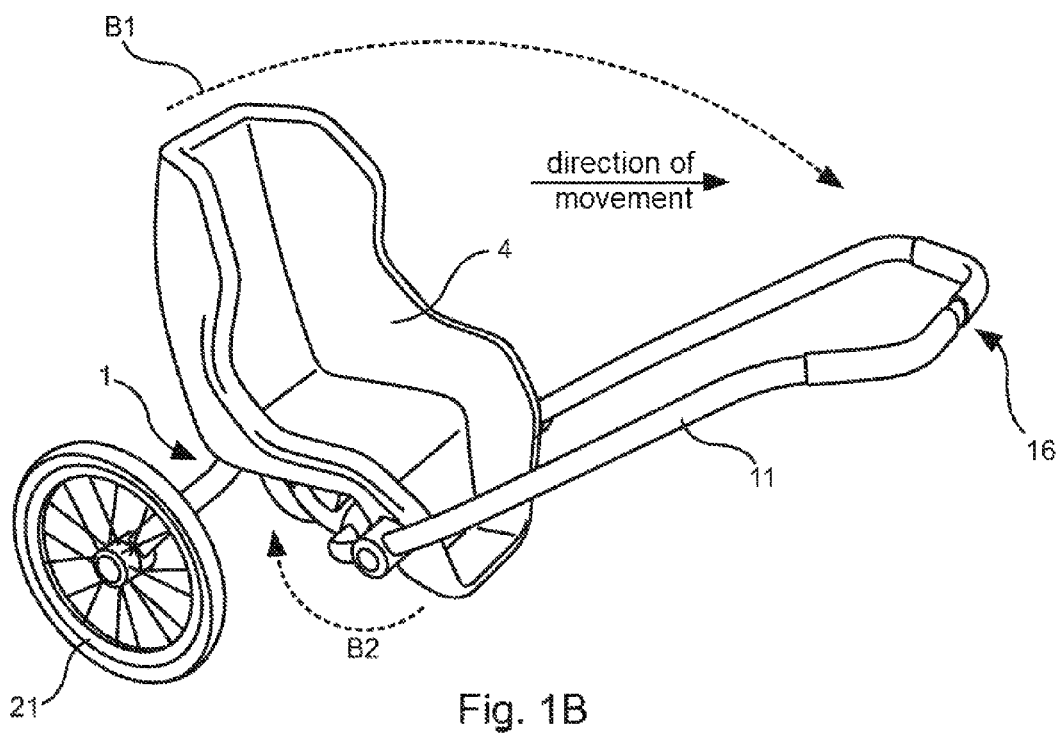

In this embodiment, the chassis, and more precisely the seat 4, carries on each side a hinging node 12 allowing the tilting of a handlebar 11 between the "stroller" position shown in FIG. 1A, and the trailer position shown in FIG. 1B.

The chassis further comprises two rear bases 14 each carrying a rear wheel 21, referred to as main wheels, which extends substantially perpendicularly to the forward direction of the stroller and therefore consequently the direction of the handlebar 11.

The rear bases 14 can for example be formed in a single part, substantially forming an open U, of which the base is secured to the seat by any suitable means.

The main wheels 21 are advantageously wheels of large diameter for example 16 inches in order to facilitate moving over obstacles, such as pavements, steps, holes, bumps, passages through the sand or on gravel. Such wheels are furthermore adapted to a use towed by a bicycle.

In the embodiment shown, the rear bases 14 are inclined towards the rear, in such a way as to offset towards the rear the axis of the rear wheels 21, which are as such located, in the "stroller" position, substantially in the same vertical plane as the upper end of the handlebar.

According to an alternative embodiment not shown, the chassis can also comprise means of damping, which can be constituted, for example, by an element made of rubber or by a spring. They as such provide the suspension for the stroller in the "stroller" position as well as in its "trailer" position.

These means of damping can for example be placed on the wheels and/or on the connection between the rear bases and the seat.

The handlebar 11 is formed of two uprights 110 arranged on either side of the stroller and connected to the hinging nodes 12 in such a way as to surround the seat 4 that carries the child. The two uprights 110 are extended by a crossmember that corresponds to a gripping area 16.

Diagrammatically, in this embodiment, the handlebar therefore has a general U-shape, and the gripping area 16 corresponds to the base of this U.

The cross-member 16 comprises, in this embodiment, two sections 161 and 162 forming handles, connected by a third central section 163 with a diameter less than that of the sections 161 and 162. This third section 163 is used for the fastening in "trailer" position to the bicycle.

According to an embodiment, the central section 163 is suited to facilitate the connection to a bicycle, and has for example a hole or a blind hole pierced transversally and perpendicularly to the direction of displacement of the stroller in "trailer" position. In other terms, the section 163 is here pierced according to the vertical with respect to the horizontal position of the handlebar 11.

Other forms of handlebars, and consequently of connections with a bicycle, can be considered. In particular, it is possible that the handlebar connected be replaced with two unconnected pushers, each provided with a handle forming a gripping area, in the "stroller" position. In this case, according to the embodiments, one or both pushers are secured to the bicycle, on the handles, in the "trailer" position.

It is therefore the gripping area 16, i.e. the upper end of the handlebar 11 in the "stroller" position, which provides a double function, on the one hand a handle (more generally an area where the user places his hand or hands to push and direct the stroller), in the "stroller" position and on the other hand of an area secured with the bicycle, in the "trailer" position.

The uprights 110 can also be adjustable in length and/or in height, for example by means of a telescopic adjustment.

At the front end of the stroller, a front base, also called a shaft 3 is fastened to each hinging node 12. A front wheel 31, or secondary wheel, is mounted at the lower end of these front bases 3 which, in the embodiment shown, are connected and are formed in the same part 5.

According to the alternatives, the axis of the front wheel is fixed or is mounted mobile pivoting with respect to a vertical axis. It can also be selectively fixed or mobile. In this latter case, two fixed positions can be provided, one for the "stroller" position and the other for the "trailer" position, taken automatically during the tilting. Moreover, the front wheel (31) can be replaced with a block of wheels, comprising two neighbouring wheels.

In the embodiment shown, the uprights 110 of the handlebar are extended by the front bases 3, which are formed in the same part. In other embodiments, this can of course be separate elements, linked on the hinging nodes 12.

The seat corresponds, in this embodiment, to an enveloping seat 4, provided with lateral elements that allow for good protection of the child. This here is a large-size seat, adapted for the transport of a child up to the age of 4 year for example, and even older. Reducers, elements of comfort, and other seats allowing for the transport of several children, can of course be provided.

According to the alternative shown, the hammock forms an element of the chassis, and carries the rear bases and the hinging nodes. According to another alternative, the hammock can be removed and be for example replaced with a shell or a nacelle. In this case, conventional means, such as those used by the Applicant and known under the registered trademark "Moduloclip" can be used to secure the hammock, or any other element, to the chassis.

This hammock, shell or nacelle can be provided with a safety harness in order to maintain the child in the seat constituted as such.

A seatbelt (not shown) can also be integrated when the child is older.

According to an alternative, a removable protective cover for inclement weather can also be secured/removed from the stroller.

FIGS. 2A, 3A, 4A and 5A respectively show the side, front, rear and top views of the stroller in "stroller" position. In this position, the handlebar 11 is used to guide and move the stroller, in particular by pushing it or by pulling it. Moreover, in this "stroller" position, the front wheel or wheels are in direct contact with the ground.

3. The Stroller in "Trailer" Position

FIG. 1B shows a perspective view of the stroller in "trailer" position after tilting of the handlebar 11 with respect to the "stroller" position of FIG. 1A. To switch from the conventional "stroller" position to the "trailer" position, only the tilting B1 of the handlebar 11 is carried out, which automatically drives the stowing B2 of the secondary wheel support 3.

Moreover, with regards to the embodiment shown in FIG. 1B, the stroller in "trailer" position comprises a single seat. Note that the stroller can also comprise several seats that can be removed and which are independent allowing for the transport of at least several children (for example two or three) side by side and/or one behind the other.

Figure 2A:
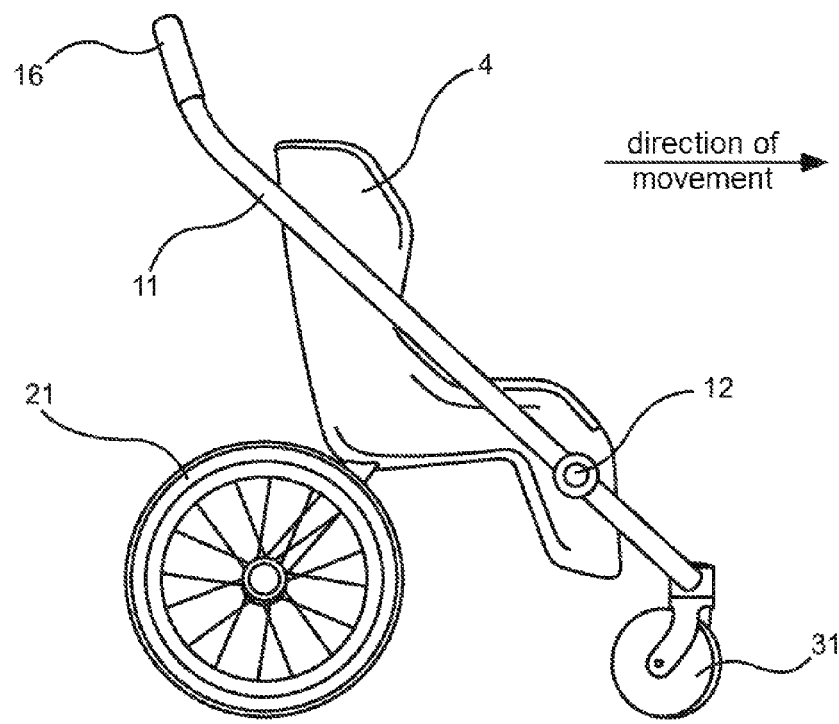
Figure 2B:
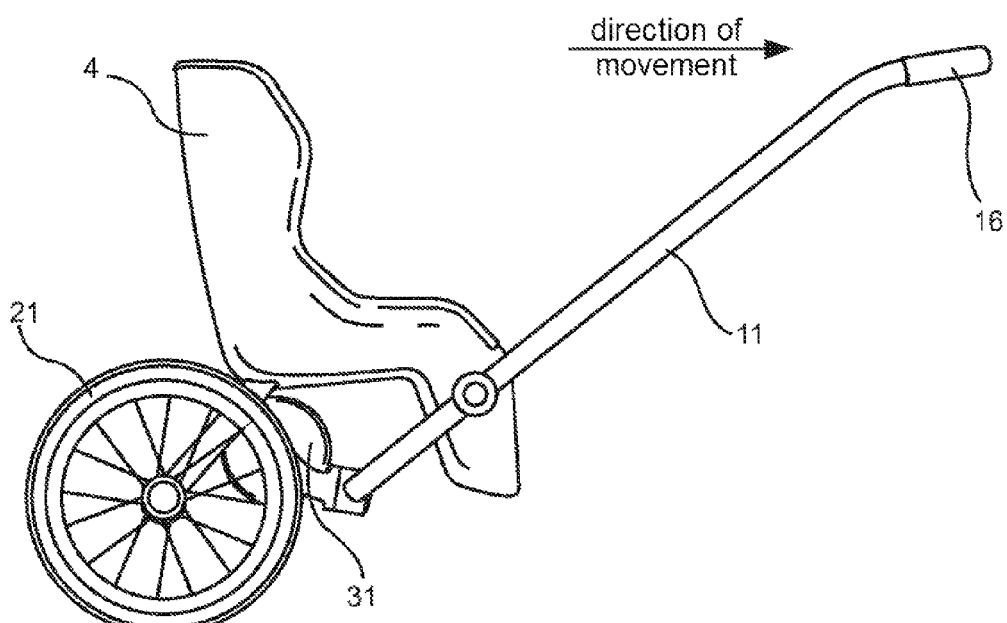
Figure 3A:
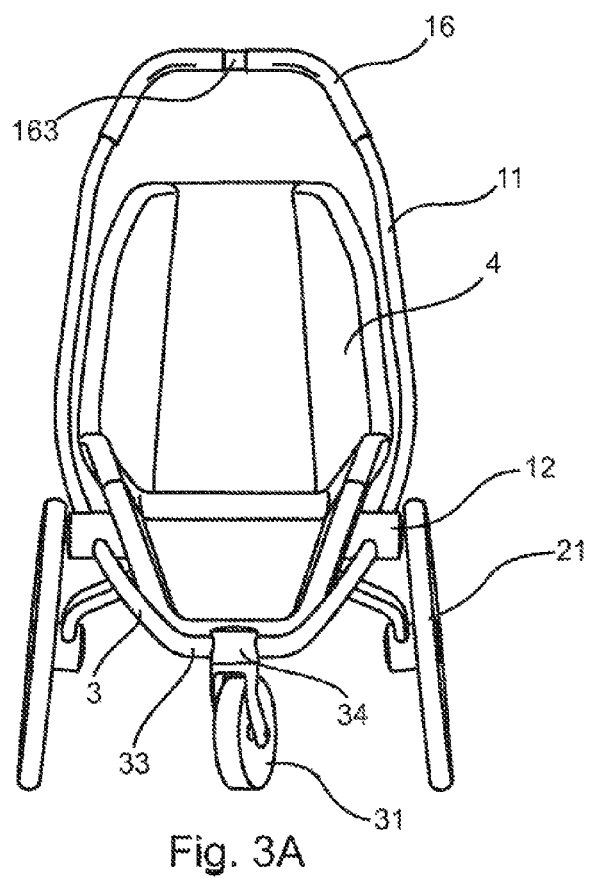
Figure 3B:
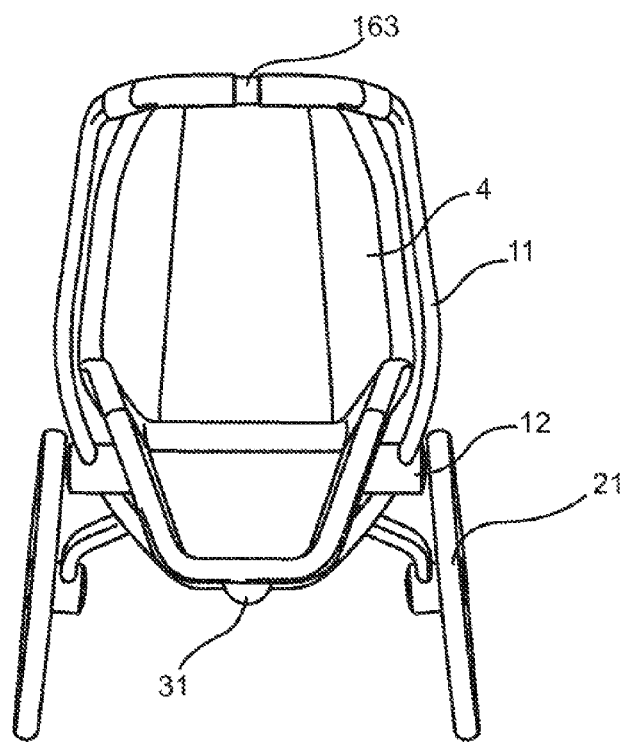
Figure 4A:
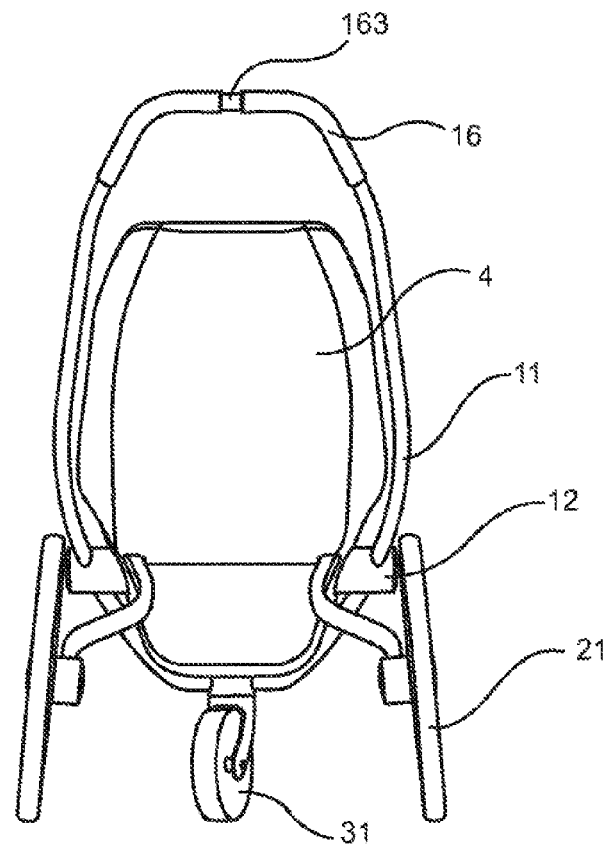
Figure 4B:
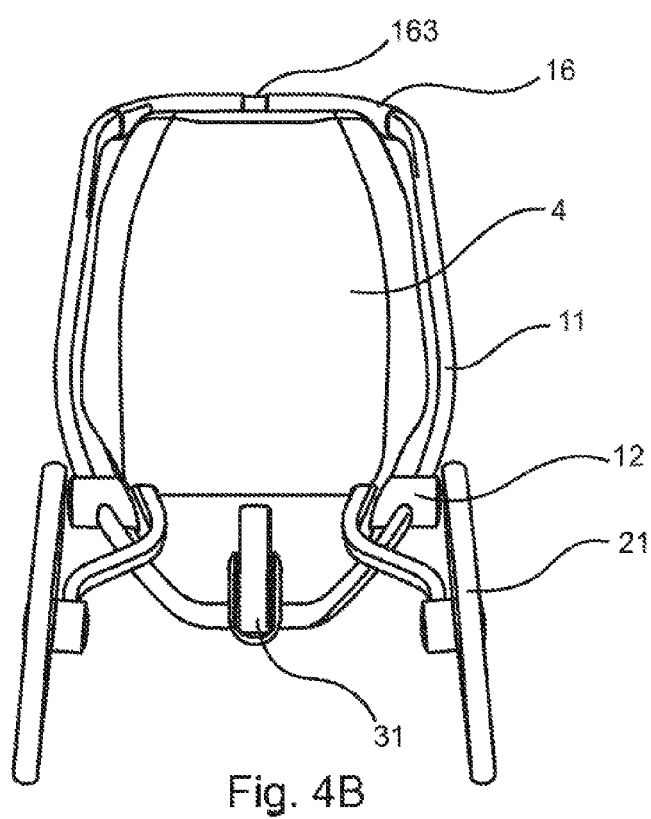
Figure 5A:
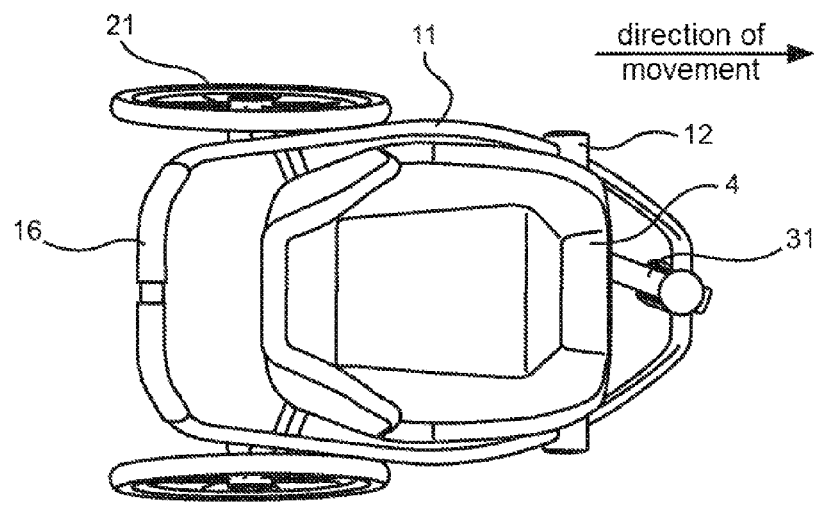
Figure 5B:
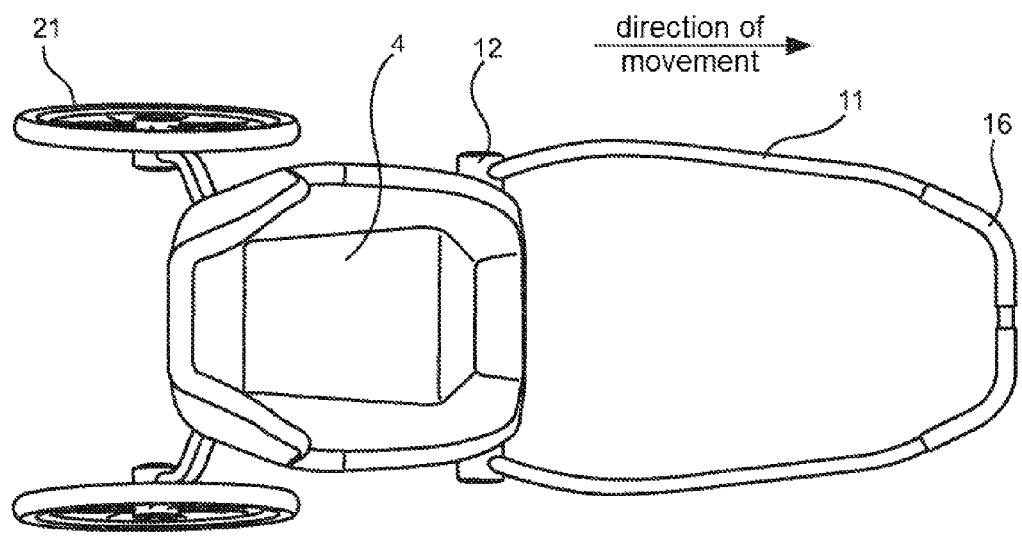

The front wheel 31 is for example moved under the seat 4 in such a way that the stroller in trailer position or hitched, now has only two wheels in contact with the ground, such as shown in particular more precisely by the side and rear views of FIGS. 2B and 4B.

As such, in the "trailer" position, only the rear wheels are active, which facilitates use by the cyclist, in comparison with a trailer position wherein the front wheels would be maintained in contact with the ground.

The stowing B2 of the front wheels under the seat is automatic and controlled by the tilting of the handlebar 11. No operation of removing the handlebar or the front wheels is therefore required to hitch the stroller to the bicycle.

Advantageously, the stowed position of the front wheel or wheels is secured by means of blocking (not shown) In particular, if the front wheel or wheels 31 can be mobile through pivoting, it can be provided that the switching to the "trailer" position result in an automatic return to the fixed position, in particular so that the wheel penetrates into a housing provided for this purpose under the seat. According to another approach, it can be provided that the front wheel 31 automatically take another fixed position, for example in order to extend flat under the seat.

Means of blocking or braking can also be provided, preventing the wheel from rotating about itself.

The child, present in the seat can remain in the seat during the passing from the "stroller position to the "trailer" position. Indeed, the dimensions of the front bases 3 and of the front wheel 31 are, according to this embodiment, chosen in such a way that the front wheel 31 remains in contact with the ground when a portion of the pivoting, without the inclination of the seat being substantially modified.

For example, the length of the front bases 3 carrying the front wheel or wheels can represent 25 to 35% of the length of the uprights 110 of the handlebar 11.

Such a proportion between the uprights 110 and the bases (or shafts) 3 makes it possible in particular to maintain the balance and stability during the change in position from stroller to trailer and inversely.

The conversion into a trailer (and inversely) according to the invention is therefore practical, rapid and secure for the child who does not need to be unattached, carried and lifted out of the seat, placed on the road and because of this exposed to the risks of the latter while the cyclist carries out the change in position of the stroller, then again carried and attached in the stroller once it is converted into a trailer.

As such, the cyclist responsible for the child preserves his child from the risks of the route and preserves himself physically by avoiding the actions linked to displacing the child during the change in position of strollers that can be transformed into trailers of prior art.

Furthermore, the balance and the comfort of the child are at least in part maintained during the change in position as the stability provided by the tilted position of the handlebar in order to be attached to the bicycle in trailer position substitutes for the stability procured by the front wheel or wheels in stroller position. It is possible, as a complement, to provide a stand, making it possible to maintain the stroller in the "trailer" position in the absence of a bicycle.

According to an alternative not shown, it is also possible that the rear bases 14 be moved during the tilting, in such a way that the rear wheels 21 are placed substantially underneath the seat 4.

With regards to FIGS. 1B, 2B and 4B, the front wheel 31 has therefore been stowed, by pivoting about an axis either upwards, or preferably under the seat 4.

According to an alternative embodiment, the handlebar can have an intermediate position, for storage, for example when it reaches a vertical position, skywards, and substantially parallel to the backrest of the seat of the child during the tipping frontwards of the seat in order to switch to "trailer" position, with the secondary wheel or wheels then being already stowed.

It is also possible to provide, when the front bases and the uprights of the handlebar are separate elements, that the hinging nodes authorise a storage position wherein the handlebar is in the "stroller" position and the front wheel is stowed under the seat.

As can be seen in FIG. 4B, which shows the stroller seen from behind, in the "trailer" position, the front wheel or wheels are stowed under the seat portion 4 of the seat, between the two rear wheels.

According to an alternative not shown, it is also possible to provide a housing within the seat or under the latter so that once retracted the secondary front wheel (or wheels) are at least partially hidden in this housing. The latter can be provided with a boss that rubs against the wheel, and which opposes the rotation thereof.

According to another alternative not shown, it is also possible that the tilting of the handlebar causes a simultaneous modification in the height of the seat 4 with respect to the ground in order to adapt the height of the seat of the child so that he can see for example over the rear wheel of the bicycle to which he is attached.

4. The Pivoting Element

The Hinging Node

The hinging node 12 allows for the tilting of the handlebar between the "stroller" position, in other terms when the handlebar is located behind the seat with respect to the direction of movement of the stroller, and the "trailer" position when the handlebar, after having passed over the seat and the head of the child, extends frontwards in the forward direction of the stroller towed by a bicycle.

More precisely, the hinging node 12 comprises a fixed portion in relation to the chassis or, in the embodiment shown in relation to the seat, and a portion mobile in rotation in relation to this fixed portion, carrying the uprights of the handlebar. Two abutments are provided on the fixed portion, defining positions for stopping the tilting, corresponding respectively to the "stroller" position and to the "trailer" position.

Where applicable, these abutments can be provided with damping elements.

Moreover, means for locking each one of these positions can be provided, for example in the form of a clutch or of a pin that engages with a corresponding hole, on one of the nodes. A central button, for example, mounted on a spring, makes it possible to disengage the clutch or the pin, and to tilt the handlebar. In the absence of action on the button, the spring blocks the unit and prevents the tilting.

This approach makes it possible, if needed, to define a storage position, as indicated hereinabove, and, if needed, several "stroller" positions (for example in order to propose several handlebar heights) and/or several "trailer" positions (for example in order to adapt to several heights or bicycle fasting methods).

Figure 9:
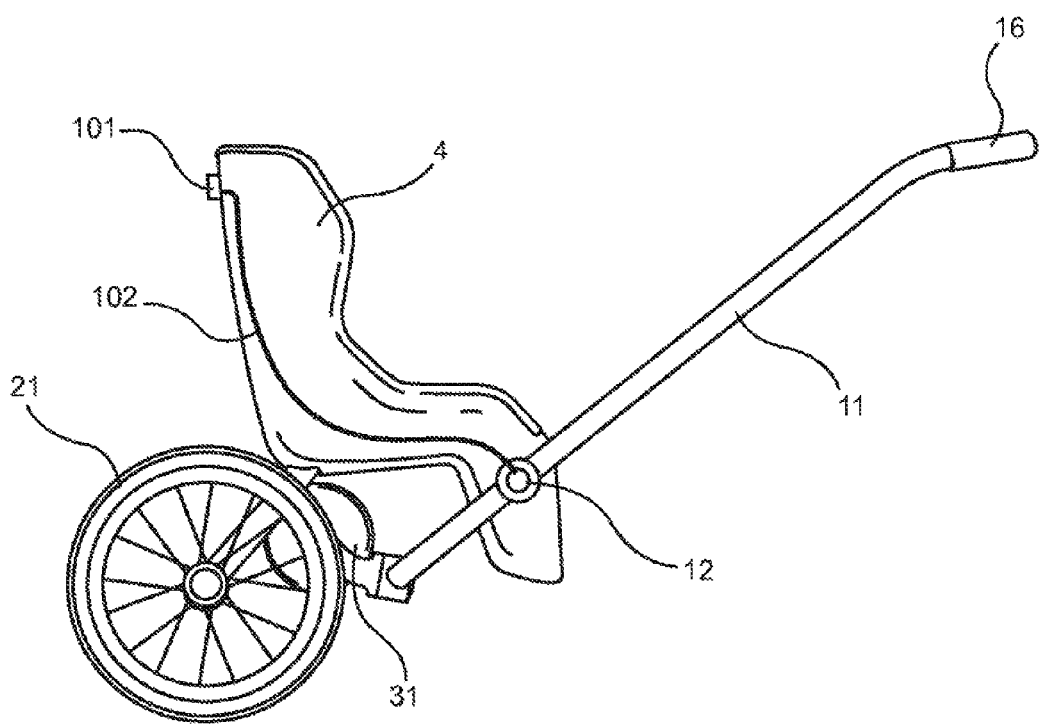
FIG. 9 shows the stroller in folded position according to an embodiment of the invention.
Figure 7A:
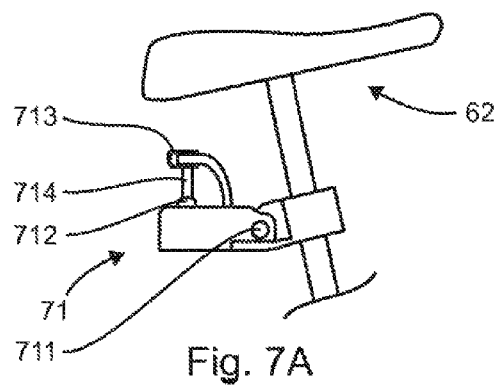
FIGS. 7A to 7D show various steps relating to the fastening of the stroller in trailer position to a bicycle.
Figure 7B:
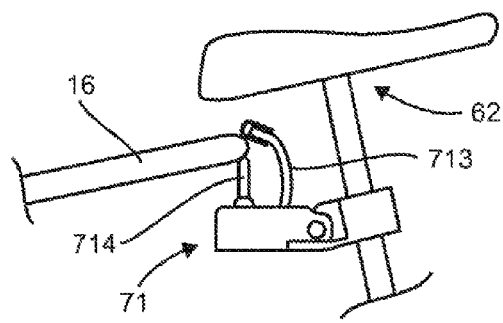
Figure 7C:
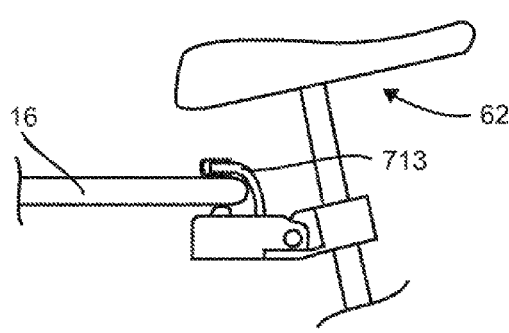
Figure 7D:
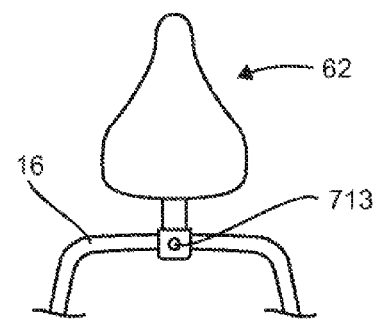

The unlocking can also be controlled remotely, as shown in the embodiment of FIG. 9. The control for unlocking 101 is placed on the top of the backrest of the seat 4, and controls the unlocking of the node 12 by the intermediary of a transmission, such as a cable 102 (which can of course be concealed in the seat). This makes it possible to more easily control the movement of the handlebar, with one hand on the seat controlling the unlocking and one hand on the handlebar providing the movement of the latter.

According to yet another approach, shown in FIGS. 10A and 10B, the means for blocking can be located in different locations, according to the position of the handlebar. In the vicinity of the front wheel 31, for example on the portion 33 that connects the two front bases 3 (FIG. 3A) and carrying the wheel support 34, or on this wheel support 34, or on one (even both) of the front bases 3, a first element for locking 91 is provided.

This first element for locking 91, diagrammatically shown in FIGS. 10A and 10B, can engage with two additional elements for locking 92, 93, that are structurally identical and also shown diagrammatically in FIGS. 10A and 10B, according to the position of the handlebar:

in the "stroller" position (FIG. 10A), with a second complementary element for locking 92 which is mounted in the vicinity of the footboard 95 secured to the seat; and in the "trailer" position (FIG. 10B), with a third additional element for locking 93 mounted in the vicinity of the lower portion of the backrest 94 of said seat 4.

The first element 91 can for example be a hook, and the second and third elements 92, 93 clamps able to maintain this hook. Many known locking alternatives can of course be adapted easily.

Preferably, the locking is automatic, i.e., at the end of the course of tilting of the handlebar, the first element for locking 91 comes into contact with the second or the third elements for locking 92, 93, and are engaged in the latter in order to have a locked state, without any other action from the user.

The locking control 110, placed at the rear or on a side of the backrest, acts simultaneously, in this embodiment, on two transmission cables 96 and 97 which respectively control the second and the third elements for locking 92, 93.

5. Means for Fastening the Stroller in "Trailer" Position to the Bicycle

Figure 6:
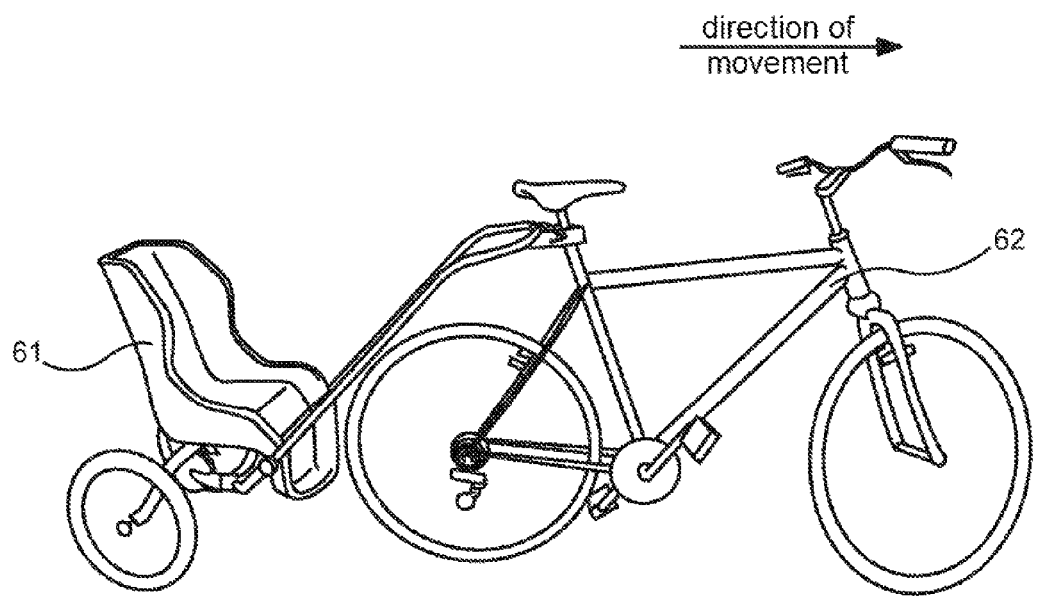
FIG. 6 shows the stroller according to the invention in trailer position attached to a bicycle.

FIG. 6 shows the stroller 61 of the invention, secured to a bicycle 62.

The means for fastening the stroller in "trailer" position to the bicycle are in particular shown in FIGS. 7A to 7D.

More precisely, means for fastening 71 are secured for example to the collar of the rod of the bicycle seat, by the intermediary of a clamping screw 711. These means for fastening are for example intended to remain on the bicycle of the user.

These means for fastening include, in the embodiment shown, a ball 712 in such a way as to allow for free movement of the hitch in relation to the bicycle during displacement such as in curves, moving over obstacles or unlevel surfaces.

The handlebar 11 of the stroller tilted in "trailer" position is fixed to the means for fastening secured to the collar of the rod of the bicycle seat, by passing a finger 714 secured to the ball through the hole of the central section 163 of the handlebar detailed hereinabove, then folding back a closing flap 713 that can be mounted elastically, and/or which allows for a manual tightening of the latter in the closed position in order to prevent any disengaging of the handlebar from the bicycle seat.

The means for fastening are for example universal means for fastening suited for any bicycle. As such, the fastening of the stroller in "trailer" position according to the invention to the seat of a bicycle is carried out rapidly without any tools or accessories. Furthermore, as indicated hereinabove no operation of removing the handlebar or the front wheels is required.

To switch back to "stroller" position, it is sufficient to apply the inverse operations, namely:
- loosening the flap 713 of the means for fastening,
- removing the ball from the means for fastening of the hole of the handlebar 11,
- where applicable, unblocking the "trailer" position from the hinging node, for example by pressing a push-button, in order to allow both the tilting of the handlebar 11 and the deployment of the front wheel or wheels,
- where applicable, blocking the hinging node in "stroller" position in order to secure the handlebar 11 in guiding position in order to guide the stroller.

Figure 8:
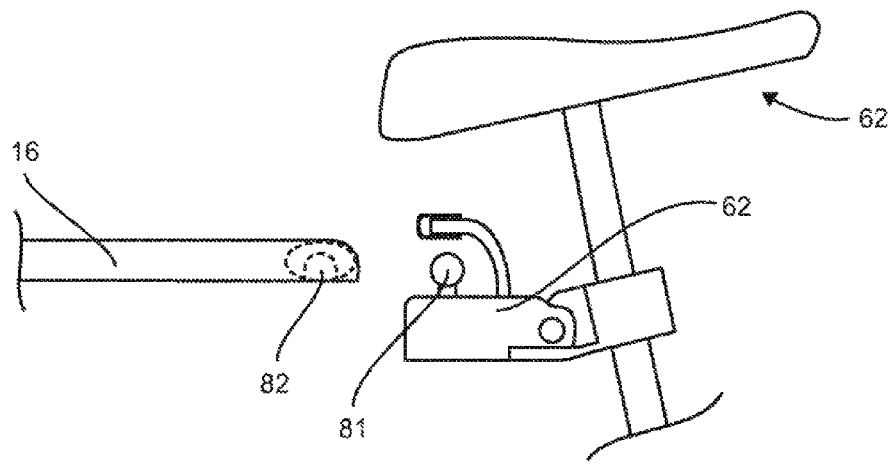
FIG. 8 shows an alternative of the means for fastening to a bicycle.

According to an alternative, shown in FIG. 8, the finger 714 can be replaced with a ball 81, engaging with a complementary concave shape 82 provided for this purpose on the gripping area 16. This approach also makes it possible for the bicycle to be able to lean over, with the two rear wheels of the trailer remaining in contact with the ground.

According to another alternative, not shown, the means for fastening can further comprise an additional offsetting part, which can be removed, extending according to the direction of displacement of the bicycle. Such an additional fastening part makes it possible to offset towards the rear of the bicycle the attaching point of the handlebar (with respect to the attaching point shown in FIGS. 7A to 7D located in the vicinity of the means for fastening secured to the collar of the rod of the bicycle seat).

Shifting towards the rear of the bicycle, with respect to the direction of displacement, of the attaching point of the handlebar, makes it possible to facilitate the clearance of the trailer, and therefore the driving comfort.

6. Folding of the Stroller

So that the stroller is as compact as possible, the hinging node controls, and optionally blocks in a storage position, using means of blocking, both the handlebar in vertical position, directed skywards and substantially parallel to the backrest of the seat of the child, and also the complete stowing of the front wheel or wheels under or within a housing of the seat.

As a complement, a reduction in the height of the handlebar can be carried out in this storage position, in particular by means of telescopic uprights 110.

In other embodiments, no particular folding is provided.

7. Other Characteristics and Advantages

Many complements, alternatives and adaptations can be provided, with respect to the embodiment described, as suggested hereinabove, in particular with regards to the chassis, the damping, the seat or seats, the folding, etc.

Means for braking can also be provided, in order to stop and immobilise the stroller, in particular in the "stroller" position. In this case, means for actuating the braking can be provided, automatically blocking the rear wheels during the tilting of the handlebar, for safety, and/or the front wheel or wheels, in the "trailer" position. It can also be provided, in this last position, means of controlling the braking, transferring a braking command from the rear wheel of the bicycle to at least one of the rear wheels of the stroller.

The invention claimed is:

1. Stroller for a child comprising
a chassis carrying at least one seat and a handle unit, wherein the handle unit includes a front-wheel unit including a front wheel or wheels, and a handlebar including an upper end configured to provide a gripping area, a lower end coupled to the front-wheel unit, and a middle portion mounted on the at least one seat for pivotable movement about a horizontal pivot axis,
and wherein the handle unit is tiltable between a stroller position, wherein said gripping area makes it possible to guide and move said stroller, and a trailer position, wherein the gripping area of the handlebar can be secured to a bicycle to provide a bicycle trailer, and
wherein the chassis carries at least one seat, and in that in the stowed position, the front wheel or wheels are moved directly under a seat portion the at least one seat carried by said chassis.

2. Stroller according to claim 1, wherein the front wheel or wheels are carried by two front shafts extending in the extension of two uprights of the handlebar, said front shafts tilting simultaneously with said uprights.

3. Stroller according to claim 2, characterised in that, on each side of said stroller, a front shaft and an upright form the same part.

4. Stroller according to claim 2, wherein a length of the front shafts represents between 25 and 35% of a length of said uprights.

5. Stroller according to claim 1, characterised in that the chassis, or said at least one seat carried by said chassis, carries two hinging nodes, allowing for said tilting.

6. Stroller according to claim 5, characterized in that at least one of said nodes carries means for blocking, able to maintain said handlebar in the stroller position and/or in the trailer position.

7. Stroller according to claim 6, further comprising means for unlocking, making it possible to release the means for blocking or the elements for locking for tilting the handlebar, comprising an unlocking control mounted on the backrest of said seat and at least one transmission cable.

8. Stroller according to claim 1, further comprising, in the vicinity of the front wheel or wheels, a first element for locking, able to cooperate respectively within the stroller position, a second complementary element for locking mounted in the vicinity of a footboard secured to the seat, and in the trailer position, a third additional element for locking mounted in the vicinity of a lower portion of a backrest of the seat.

9. Stroller according to claim 1, wherein the at least one seat carries the handlebar and/or bases of a rear wheel.

10. A mobile child transport unit comprising
a rolling frame including a left rear wheel and a right rear wheel,
a juvenile seat mounted on the rolling frame to roll therewith and configured to include a seat bottom and a seat back extending upwardly from the seat bottom, and
a tiltable handle unit including a hand grip, a front-wheel unit including a front wheel, and a handlebar including an upper end coupled to the handgrip, a lower end coupled to the front-wheel unit, and a middle portion mounted on the juvenile seat for pivotable movement about a horizontal pivot axis from a rearwardly extending stroller position wherein the seat back is located between the handgrip and the front-wheel unit to position the front wheel in an extended position away from the left and right rear wheels and in rolling engagement with ground underlying the juvenile seat during rolling movement of the left and right rear wheels on the ground and to position the handgrip behind the seat back to locate the seat back between the handgrip and the seat bottom so as to establish a stroller mode of the mobile child transport unit to a forwardly extending bicycle-trailer position wherein the front wheel is located under the seat bottom in an elevated position above and in spaced-apart disengaged relation to the ground during rolling movement of the left and right wheels on the ground and to position the handgrip in front of the seat back to locate the seat bottom between the handgrip and the left and right rear wheels to establish a trailer mode of the mobile child transport unit.

11. The transport unit of claim 10, wherein the handlebar of the tiltable handle unit is oriented to extend in a negatively sloping direction to locate the handgrip behind the seat back upon movement of the handle unit about the horizontal pivot axis to assume the rearwardly extending stroller position and the handlebar of the tiltable handle unit is oriented to extend in a positively sloping direction to locate the handgrip in front of the seat back upon movement of the handle unit about the horizontal pivot axis to assume the forwardly extending bicycle-trailer position.

12. The transport unit of claim 11, wherein the front wheel is arranged to lie in a space provided between the left and right rear wheels upon movement of the handle unit about the horizontal pivot axis to assume the forwardly extending bicycle-trailer position.

13. The transport unit of claim 11, wherein the juvenile seat further includes a footrest arranged to lie below the seat bottom to locate the seat bottom between the footrest and the seat back, the front wheel is arranged to lie behind the footrest upon movement of the tiltable handle unit about the horizontal pivot axis to assume the forwardly extending bicycle-trailer position, and the front wheel is arranged to lie in front of the footrest upon movement of the tiltable handle unit about the horizontal pivot axis to assume the rearwardly extending stroller position.

14. The transport unit of claim 13, wherein the horizontal pivot axis is arranged to lie below the seat bottom and above the footrest.

15. The transport unit of claim 13, wherein the handlebar of the tiltable handle unit includes a left-side portion arranged to extend from the handgrip to the front-wheel unit and lie along a left side of the juvenile seat and a right-side portion arranged to extend from the handgrip to the front-wheel unit and lie along a right side of the juvenile seat and each of the left-side and right-side portions includes a lower segment arranged to extend from the horizontal pivot axis to the front-wheel unit and a relatively longer upper segment arranged to extend from the horizontal pivot axis to the handgrip.

16. The transport unit of claim 15, wherein each of the lower segments has a length that represents 25 percent to 35 percent of a length of a companion upper segment.

17. The transport unit of claim 10, wherein the handgrip and the handlebar cooperate to form means for pushing the juvenile seat in a forward direction with the front wheel leading the left and right rear wheels in response to application of a pushing force in the forward direction to the handgrip when the handlebar occupies the rearwardly extending stroller position and for pulling the juvenile seat in the forward direction after the front wheel has been moved to assume the elevated position in response to application of a pulling force in the forward direction to the handgrip when the handlebar occupies the forwardly extending bicycle-trailer position.

18. The transport unit of claim 10, wherein the handlebar is arranged to be pivoted about the horizontal pivot axis through an angle of about 90° to move the handlebar from the rearwardly extending stroller position to the forwardly extending bicycle-trailer position while a child is seated on the juvenile seat.

19. The transport unit of claim 10, further comprising a rotation-blocker lock coupled to the middle portion of handlebar and to the juvenile seat to block rotation of the middle portion of the handlebar relative to the juvenile seat about the horizontal pivot axis and release means for unlocking the rotation-blocker lock to allow rotation of the middle portion of the handlebar about the horizontal pivot axis, wherein the release means comprises a lock controller mounted on the seat back and a cable arranged to interconnect the lock controller and the rotation-blocker lock.

20. The transport unit of claim 10, further comprising rotation-blocker means for blocking pivoting movement of the handlebar about the horizontal pivot axis and retaining the handlebar in a selected one of the rearwardly extending stroller position and the forwardly extending position.

21. The transport unit of claim 20, wherein the rotation-blocker means comprises a first element coupled to the handlebar to pivot therewith about the horizontal pivot axis, a second element coupled to a rearward portion of the juvenile seat and configured to lock automatically with the first element to retain the handlebar in the forwardly extending bicycle-trailer position upon arrival of the handlebar at the forwardly extending bicycle-trailer position, and a third element coupled to a forward portion of the juvenile seat and configured to lock automatically with the first element to retain the handlebar in the rearwardly extending stroller position upon arrival of the handlebar at the rearwardly extending stroller position.

22. The transport unit of claim 21, further comprising release means for unlocking the first element from the second element to free the handlebar for pivoting movement about the horizontal pivot axis from the forwardly extending bicycle-trailer position to the rearwardly extending stroller position and for unlocking the first element from the third element to free the handlebar for pivoting movement about the horizontal pivot axis from the rearwardly extending stroller position to the forwardly extending bicycle-trailer position.

23. The transport unit of claim 22, wherein the release means comprises a lock controller mounted on the seat back and a cable arranged to interconnect the lock controller and the first element.

24. The transport unit of claim 10, further comprising means for fastening the handgrip of the tiltable handle unit to a bicycle while the handlebar occupies the forwardly extending bicycle-trailer position so that the juvenile seat is supported for rolling movement by the left and right rear wheels and the front wheel is retained in the elevated position above and in spaced-apart disengaged relation to the ground.

25. A mobile child transport unit comprising
a rolling frame including a left rear wheel and a right rear wheel,
a juvenile seat mounted on the rolling frame to roll therewith and configured to include a seat bottom and a seat back extending upwardly from the seat bottom, and
a tiltable handle unit including a hand grip, a front-wheel unit including a front wheel, and a handlebar,
wherein the seat back is located between the handgrip and the front-wheel unit to position the front wheel in an extended position away from the left and right rear wheels and in rolling engagement with ground underlying the juvenile seat during rolling movement of the left and right rear wheels on the ground and to position the handgrip behind the seat back to locate the seat back between the handgrip and the seat bottom so as to establish a stroller mode of the mobile child transport unit to a forwardly extending bicycle-trailer position wherein the front wheel is located under the seat bottom in an elevated position above and in spaced-apart disengaged relation to the ground during rolling movement of the left and right wheels on the ground and to position the handgrip in front of the seat back to locate the seat bottom between the handgrip and the left and right rear wheels to establish a trailer mode of the mobile child transport unit,
wherein the handlebar of the tiltable handle unit includes a left-side portion arranged to extend from the handgrip to the front-wheel unit and lie along a left side of the juvenile seat and a right-side portion arranged to extend from the handgrip to the front-wheel unit and lie along a right side of the juvenile seat and each of the left-side and right-side portions includes a lower segment arranged to extend between the horizontal pivot axis to the front-wheel unit, a relatively longer upper segment arranged to extend between the horizontal pivot axis to the handgrip, and a hinging node arranged to interconnect the companion lower and upper segments,
wherein a left hinging node included in the left-side portion of the handlebar is arranged to extend along the horizontal pivot axis and is coupled to the juvenile seat and to each of the lower and upper segments of the left-side portion and a right hinging node included in the right-side portion of the handlebar is arranged to extend along the horizontal pivot axis and is coupled to the juvenile seat and to each of the lower and upper segments of the right-side portion, and
wherein each hinging node comprises a fixed portion coupled to the juvenile seat and a companion mobile portion mounted on the fixed portion for rotation about the horizontal pivot axis and coupled to the companion lower and upper segments.

26. Stroller for a child comprising
a chassis carrying at least one seat and a handle unit, wherein the handle unit includes a front-wheel unit including a front wheel or wheels, and a handlebar including an upper end configured to provide a gripping area, a lower end coupled to the front-wheel unit, and a middle portion mounted on the at least one seat for pivotable movement about a horizontal pivot axis,
wherein the handle unit is tiltable between a stroller position, wherein said gripping area makes it possible to guide and move said stroller, and the front-wheel unit is in contact with the ground, and a trailer position, wherein the gripping area of the handlebar can be secured to a bicycle to provide a bicycle trailer, and the front-wheel unit is in a stowed position, not interacting with the ground in the trailer position,
and wherein the at least one seat directly carries the handle unit and bases of a rear wheel.

27. Stroller for a child comprising
a chassis carrying at least one seat and a handle unit, wherein the handle unit includes a front-wheel unit including a front wheel or wheels, and a handlebar including an upper end configured to provide a gripping area, a lower end coupled to the front-wheel unit, and a middle portion mounted on the at least one seat for pivotable movement about a horizontal pivot axis,
wherein the handle unit is tiltable between a stroller position, wherein said gripping area makes it possible to guide and move said stroller, and the front-wheel unit is in contact with the ground, and a trailer position, wherein the gripping area of the handlebar can be secured to a bicycle to provide a bicycle trailer, and the front-wheel unit is in a stowed position, not interacting with the ground in the trailer position,
and wherein the stroller further comprises, in the vicinity of the front wheel unit, a first element for locking, able to cooperate respectively within the stroller position, a second complementary element for locking mounted in the vicinity of a footboard secured to the seat, and in a trailer position, a third additional element for locking mounted in the vicinity of a lower portion of a backrest of the seat.

* * * * *